No. 744,519. PATENTED NOV. 17, 1903.
E. ERNST.
FRUIT CHOPPER AND PRESS.
APPLICATION FILED JULY 15, 1903.
NO MODEL.

Witnesses:
H. B. Hullock
L. H. Morrison

Inventor:
Edward Ernst
By
Atty.

No. 744,519.

Patented November 17, 1903.

UNITED STATES PATENT OFFICE.

EDWARD ERNST, OF PHILADELPHIA, PENNSYLVANIA.

FRUIT CHOPPER AND PRESS.

SPECIFICATION forming part of Letters Patent No. 744,519, dated November 17, 1903.

Application filed July 15, 1903. Serial No. 165,688. (No model.)

*To all whom it may concern:*

Be it known that I, EDWARD ERNST, a citizen of the United States, residing at Philadelphia, county of Philadelphia, and State of Pennsylvania, have invented a certain new and useful Improvement in Fruit Choppers and Presses, of which the following is a specification.

My invention relates to a new and useful improvement in fruit choppers and presses, and has for its object to provide a utensil whereby the material placed in the same will be first cut or chopped and then pressed by the simple manipulation of one handle; and a further object of my invention is to so construct the same that it can be manufactured at a comparatively small cost, and all parts are made easily removable to facilitate the cleaning of the same.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
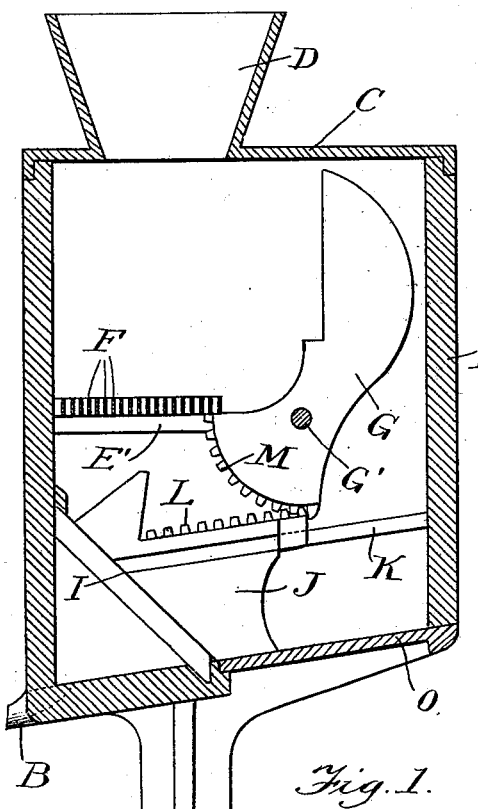
Figure 2:
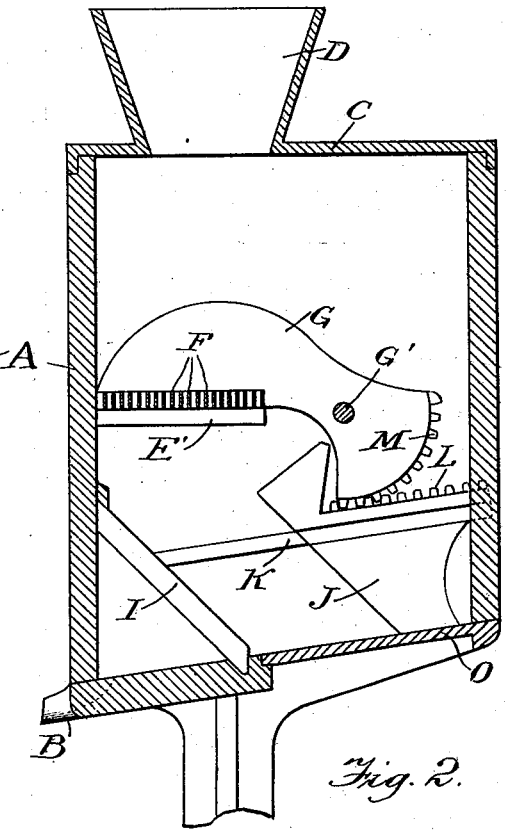
Figure 3:
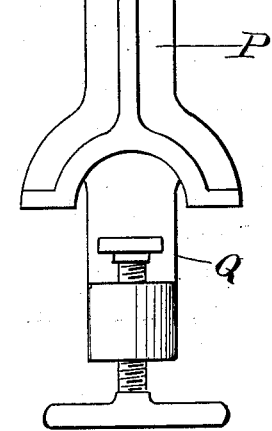
Figure 3:
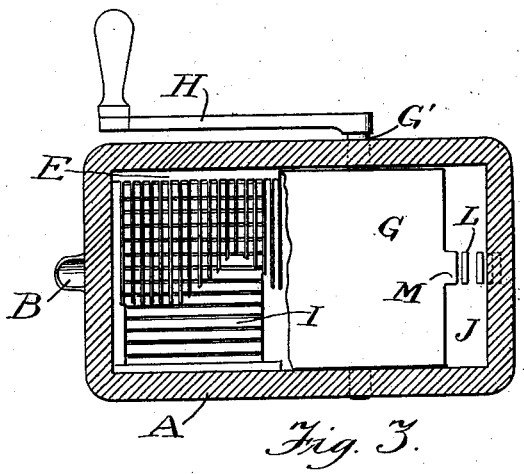

Figure 1 is a vertical section through the device showing the parts in position for receiving the material to be operated upon; Fig. 2, a similar view to Fig. 1, showing the parts in the position they assume when the material has been chopped or cut; Fig. 3, a horizontal section through the upper portion of the device, the knives being broken away to show the parts beneath.

A represents the body or casing of the device, which may be of any suitable shape or design, the bottom of the body or box being inclined to one side, from which a spout B leads for conveying away the juice. The upper portion of the body is closed by a removable cover, to which is attached a hopper D, through which the material to be operated upon is inserted.

Located upon the interior of the body is a frame E, which rests upon ledges E', the frame being removable. This frame supports a number of knives F, extending across the frame from one side to the other, and the material to be operated upon is designed to drop directly from the hopper upon these knives. G is a plunger pivoted to the body at the point G', and the pivotal point G' of this plunger extends through the casing and has connected to it the crank or handle H. The plunger G is of the full width of the casing, and therefore after the material has been inserted in the machine by turning the crank a part revolution the plunger will be caused to descend upon the material and press the same through the knives F, so as to chop or cut the material.

While I have shown the knives as only extending transversely across the machine, it is obvious that the knives could extend in the other direction or in both and can be any distance apart desired, so as to cut the material fine or coarse.

Located below the knives is an inclined grating consisting of a series of strips located a slight distance apart. J is a plunger adapted to slide upon the guideways K, located in the side of the body, and upon the upper surface of this plunger is provided a number of cog-teeth L, and the lower end of the pivoted plunger G is formed concentric with its pivotal point, and this concentric surface is provided with cog-teeth M, meshing with the teeth L. Thus when the plunger G is pressed downward upon the knives, as shown in Fig. 2, the movement of this plunger will slide the plunger J back to the position shown in Fig. 2 and the material which has been cut and forced through the knives will fall downward into the space between the grating and the plunger J, and then when the movement of the crank H is reversed, so as to rock the plunger G in the position shown in Fig. 1, the plunger J will be forced toward the grating I and the juice will be squeezed out of the material, said juice passing through the grating and out of the spout B. The pulp can then be removed and allowed to fall out by pulling back the slide O in the bottom of the body. Thus it will be seen that by simply rocking the crank backward and forward once the material will be cut and pressed and leave the device in position for receiving new material. Thus a very convenient household article is supplied which may be manufactured at a small cost and yet be durable and efficient in action, and on account of the easy removability of all the parts the device can be kept thoroughly cleaned.

Extending downward from the body is an arm P, the lower end of the arm provided with the clamp Q, whereby the device may be attached to a table or other support; but of course, if desired, this device can be so manufactured as to be secured against the wall.

Of course I do not wish to be limited to the exact construction here shown, as slight modifications could be made without departing from the spirit of my invention.

Having thus fully described my invention, what I claim as new and useful is—

1. In a combined chopper and press, a hollow body, a hopper extending from the upper end of the body, a series of removable transverse knives located within the body directly under the hopper, a pivoted plunger adapted to rock downward upon the knives, a crank or handle connected to the plunger outside of the body for moving the same, an inclined grating arranged below the knives, a reciprocating plunger adapted to operate in conjunction with the grating to form the press, means for moving the plunger toward the grating as the pivoted plunger is raised, and moving the same away from the grating when the pivoted plunger descends, a spout leading from the casing for conveying the juice, the body provided with an opening through its lower end for the removal of the pulp, and a slide adapted to normally close said opening, as and for the purpose specified.

2. In a device of the character described, a body or casing, a hopper extending from the casing through the upper end, a series of removable horizontal knives located in the casing below the hopper, a plunger adapted to descend upon the material and press the same through the knives, a grating arranged below the knives, a plunger adapted to coact with the grating to press the material, a handle for manipulating the first-named plunger, means for causing the last-named plunger to travel toward the grating as the first-named plunger is raised, and vice versa, as and for the purpose specified.

3. In a device of the character described, a casing, means for securing said casing to a support, a removable cover closing the open end of the casing, a hopper extending through the cover, a horizontal removable frame located underneath the hopper, knives secured in said frame, the knives arranged so as to leave spaces in between the same, a plunger pivoted in the casing and adapted to descend upon the knives, a crank or handle secured to the pivotal point of the plunger for manipulating the same, an inclined grating arranged below the knives, a reciprocating plunger adapted to coact with the grating to form a press, cog-teeth formed upon the upper surface of said reciprocating plunger, cog-teeth arranged upon the lower end of the pivoted plunger concentric with the pivotal point, the teeth of each plunger adapted to mesh with one another, a spout for conveying away the juice, the bottom of the casing inclined toward the spout and provided with an opening for removing the pulp, and a slide adapted to normally close said opening, as and for the purpose specified.

In testimony whereof I have hereunto affixed my signature in the presence of two subscribing witnesses.

EDWARD ERNST.

Witnesses:
MARY E. HAMER,
L. W. MORRISON.